United States Patent Office 3,166,295
Patented Jan. 19, 1965

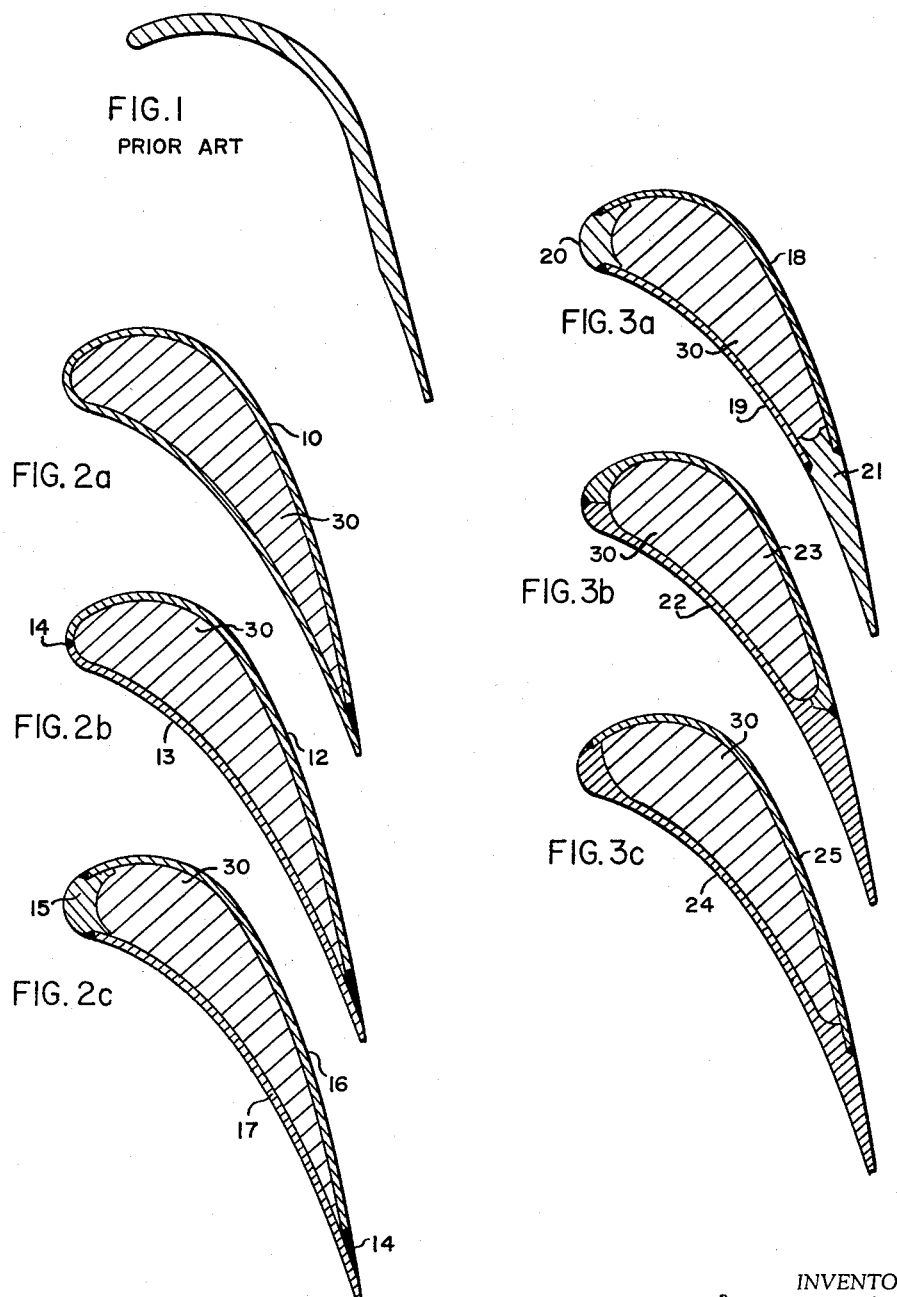

3,166,295
GUIDE WHEEL FOR CONDENSING TURBINES OF GREAT AND GREATEST POWER
Robert Tadeusz Szewalski, Gdansk, and Benedykt Teodor Wieczorek, Warsaw, Poland, assignors to Zaklady Mechaniczne Im. Gen. K. Swierczewskiego
Filed Aug. 23, 1960, Ser. No. 51,759
Claims priority, application Poland, Aug. 24, 1959, P 91,903
1 Claim. (Cl. 253—78)

The invention relates to a guide-wheel for turbines of great power, allowing the use of any profiles of the shell-type-vanes.

The guide-wheel according to the invention has shell-type tubular rigid blades or vanes secured to an inner ring and to an outer ring, assuring an increase of efficiency of the wheel and a considerable improvement of its strength. The construction of the vane itself together with the welded construction of the wheel permits the realization of a guide-channel of any shape, without the restrictions involved by the production of hitherto used vanes and without the costs connected with the material and with the treatment of long vanes.

Moreover, the invention eliminates the difficulties connected with fixing the vanes in the cast material of the rings of the guide-wheel. The application of a welded construction permits the use both of forged steel and of cast steel.

Figure 4:
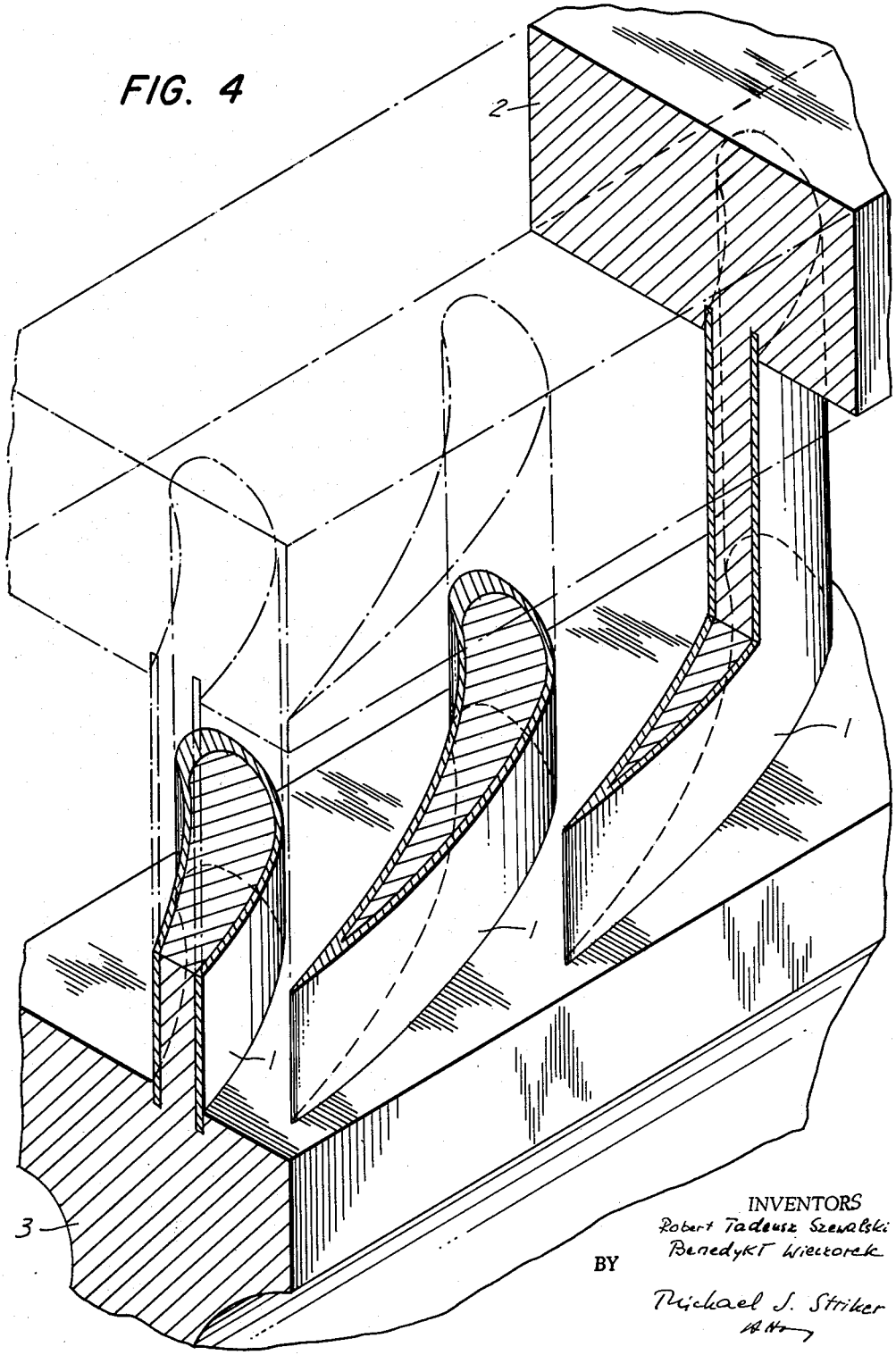
Figure 5:
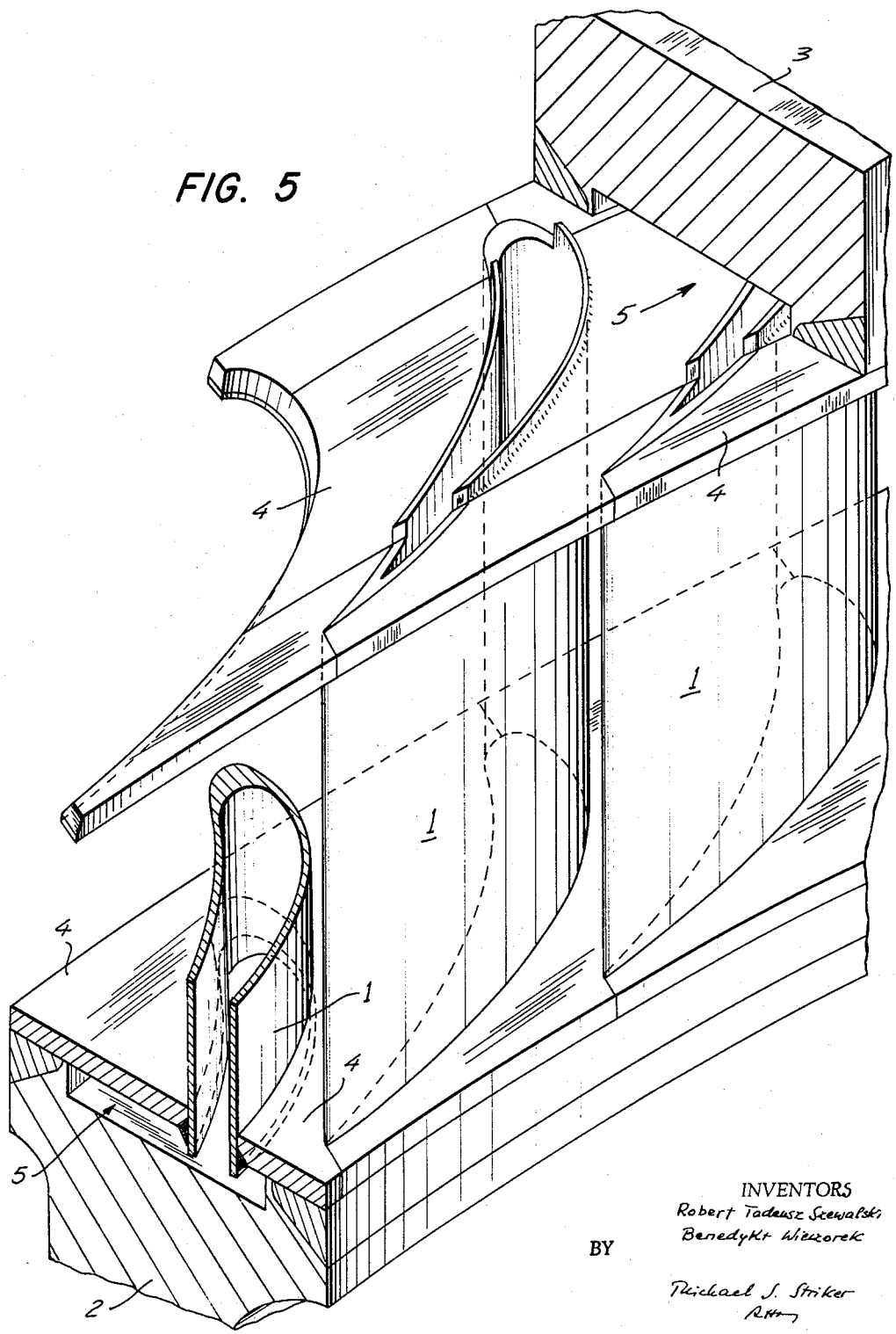
Figure 6:
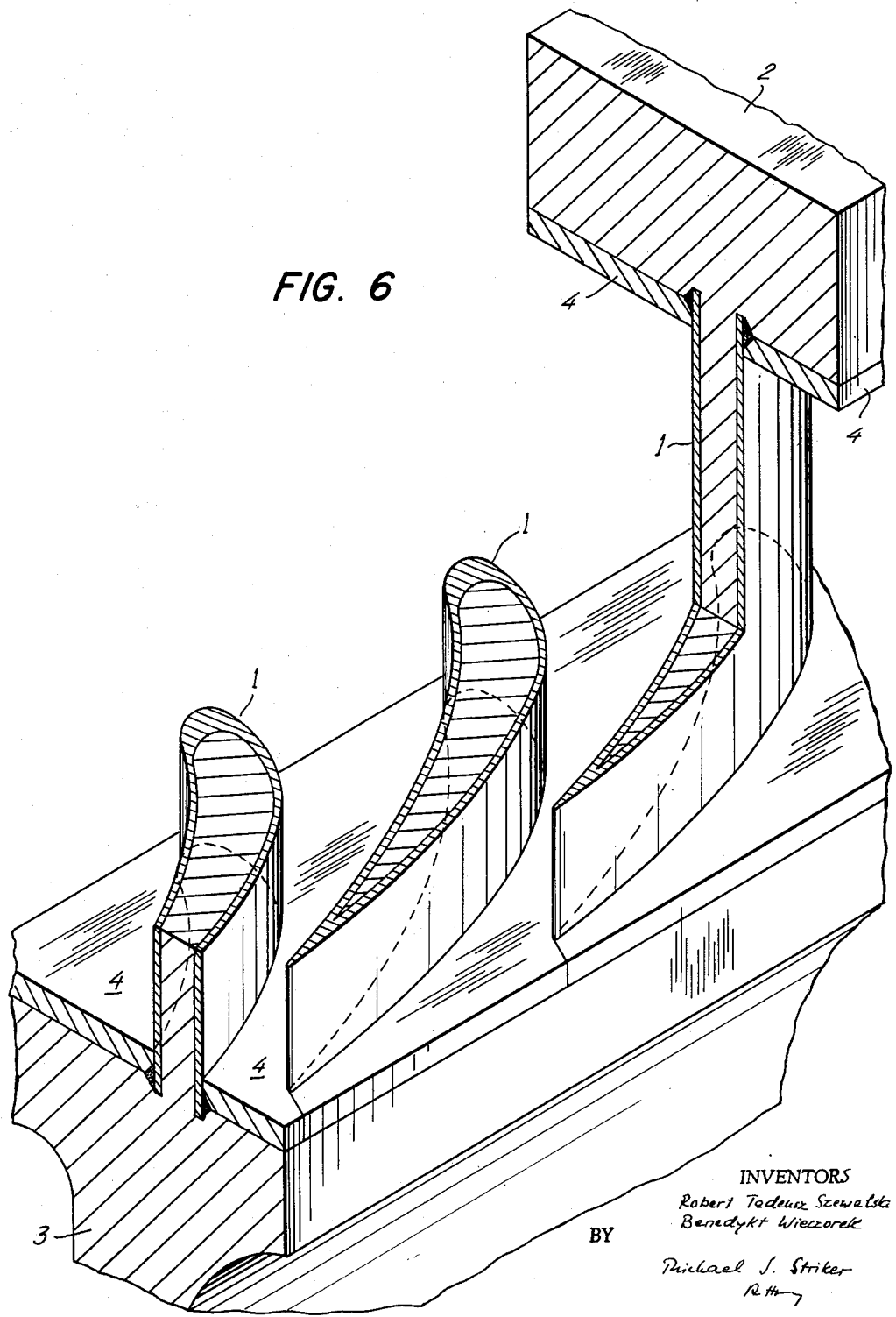

To make the object of the invention clearer, preferred embodiments are shown in the drawing in which FIG. 1 is a section of the plate hitherto used as a vane, FIGS. 2a, 2b, 2c and 3a, 3b, 3c are cross sections of some modifications of vanes according to the invention, FIG. 4 illustrates, partially in section, a perspective view of a part of a guide-wheel having tubular-vanes sealed into the cast-iron disc, FIG. 5 is, like FIG. 4, a view of a part of the guide-wheel having welded tubular vanes, and FIG. 6 is a fragmentary perspective view illustrating another embodiment of the invention.

The tubular blades or vanes are made by bending metal plates, and welding them together. Either one plate 10 is bent to streamlined shape and welded at 11, see FIG. 2a, or two plates 12, 13 are welded together at the leading and trailing edges at 14, see FIG. 2b, or the trailing ends of plates 16 and 17 are welded together at 14, and a machined insert 15 is welded to the leading edges of plates 16 and 7, see FIG. 2c. In the embodiment of FIG. 3a, machined inserts are made at the trailing and leading edges of curved plates 18 and 19 and welded to the same. Two machined plates 22 and 23 are welded together in the construction of FIG. 3b, and one machined plate 24 is welded to a bent plate 25 in the construction of FIG. 3c. The hollow vanes are filled by cast material 30.

The method of fixing the tubular blades by sealing into the inner ring 3 and outer ring 2 is illustrated in FIG. 2. During this process the inside of the vanes is filled with the cast iron material of the rings, which fact increases the rigidity of the vane itself and increases the strength of the guide-wheel as a whole. The small mass of the outer coat of the vane easily heatens in casting, does not cool the cast-iron and admits a good fusion of the rings with the material, giving a stiff ribbed construction.

A modified construction of uniting the tubular blades with the inner ring 3 and outer ring 2 of the guide-wheel is illustrated in FIG. 5. In this case at first relatively thin annular plate members are made which limit the channel of the guide-wheel and are divided into sections which are welded together. Openings corresponding to the outline of the vanes are formed by the edges of the sections, and the tubular blades 1 are placed therein. The blades 1 and the rings 4 are welded together on their contacting spots. The joints are on places of easy access, are easily made, and are of good quality. The so formed structure is then placed between the outer ring 2 and the inner ring 3 and thereupon welded to the same.

The application of sections 4 is a great advantage of the invention because they admit any shape of the walls limiting the guide-channels on the outer and inner circumference of the wheel. In hitherto known guide-wheels the optional shape of the guide-channel was possible but in a limited degree, while in the longitudinal section, radial sections, only a rectilinear delimitation, corresponding to the cylindrically or conically shaped surfaces or to the combination of both was obtainable. When compared with hitherto known solutions, one obtains also a greater strength due to the elimination of restrictions regarding the choice of the thickness of the sections 4, in connection wherewith the necessity of making openings shaped as the profile of the vanes is eliminated.

The guide-wheel according to the invention shows also circumferential passages 5 allowing making use of the free inner spaces of the tubular blades 1 for improving the cooling of the turbine, for instance by heat exchange of the working agent.

FIG. 6 illustrates a modification of FIG. 4 in which annular plates 4 composed of sections are secured to the inner surfaces of the annular cast members 2 and 3. The ends of the tubular blades are welded to the annular plates 4. The sections of plate 4 are welded together and define with adjacent sections opening of outline to which the blades 1 fit.

An advantage of the guide-wheel according to the invention is also the possibility of considerably increasing the strength of the wheel due to the application of shell-type-vanes, this fact allowing decreasing the axial dimensions of the wheel and thereby also shortening the turbine in axial direction.

What we claim is:

A turbine guide wheel comprising, in combination, a first annular plate member composed of a plurality of sections welded together and having edges defining circumferentially spaced stream lined openings in said plate member; a second annular plate member composed of a plurality of sections welded together to define circumferentially spaced stream lined openings in said second plate member, said first and second plate members confronting each other so that corresponding openings in the first and second plate members are aligned; and a set of rigid tubular blades extending between said first and second plate members, each blade including a rigid curved plate means shaped to provide a stream lined cross section for the blade matching a pair of openings in said first and second plate members, the ends of each blade being located in a pair of said openings, respectively and positioned adjacent to said edges of said first and second plate members, respectively; a pair of cast annular members respectively welded to said plate members and closing the open ends of said blades; and cast cores in said tubular blades forming an integral cast structure with said cast annular members.

References Cited by the Examiner

UNITED STATES PATENTS

| | | | |
|---|---|---|---|
| 1,470,508 | 10/23 | Steenstrup | 253—77 |
| 1,530,249 | 3/25 | Eveleth | 253—77 |
| 1,938,382 | 12/33 | Haigh | 253—77 |
| 2,110,679 | 3/38 | Robinson | 253—77 |
| 2,183,158 | 12/39 | Bennett | 253—77 |
| 2,256,479 | 9/41 | Holzworth | 253—77 |
| 2,337,619 | 12/43 | Miller | 253—77 |
| 2,347,034 | 4/44 | Doran | 253—77 |
| 2,407,164 | 9/46 | Kimball | 253—78 |
| 2,463,340 | 3/49 | Wiberg | 253—77 |
| 2,500,745 | 3/50 | Bloomberg | 253—77 |
| 2,510,735 | 6/50 | Bodger | 253—78 |
| 2,690,132 | 9/54 | Misch | 253—39 |
| 2,754,915 | 7/56 | Echererria | 253—77 |
| 2,884,077 | 4/59 | Stamm et al. | 29—156.8 |
| 2,912,222 | 11/59 | Wilkes | 253—78 |
| 2,931,622 | 4/60 | Klompas et al. | 253—78 |

FOREIGN PATENTS

| | | |
|---|---|---|
| 895,885 | 4/44 | France. |
| 885,851 | 8/53 | Germany. |
| 666,536 | 2/52 | Great Britain. |
| 720,956 | 12/54 | Great Britain. |

LAURENCE V. EFNER, *Primary Examiner.*

JOSEPH H. BRANSON, WALTER BERLOWITZ,
*Examiners.*